J. I. McCORMICK.
MEAT ADJUSTING PLATE FOR SLICING MACHINES.
APPLICATION FILED JAN. 6, 1913.
1,242,958.
Patented Oct. 16, 1917
3 SHEETS—SHEET 1.
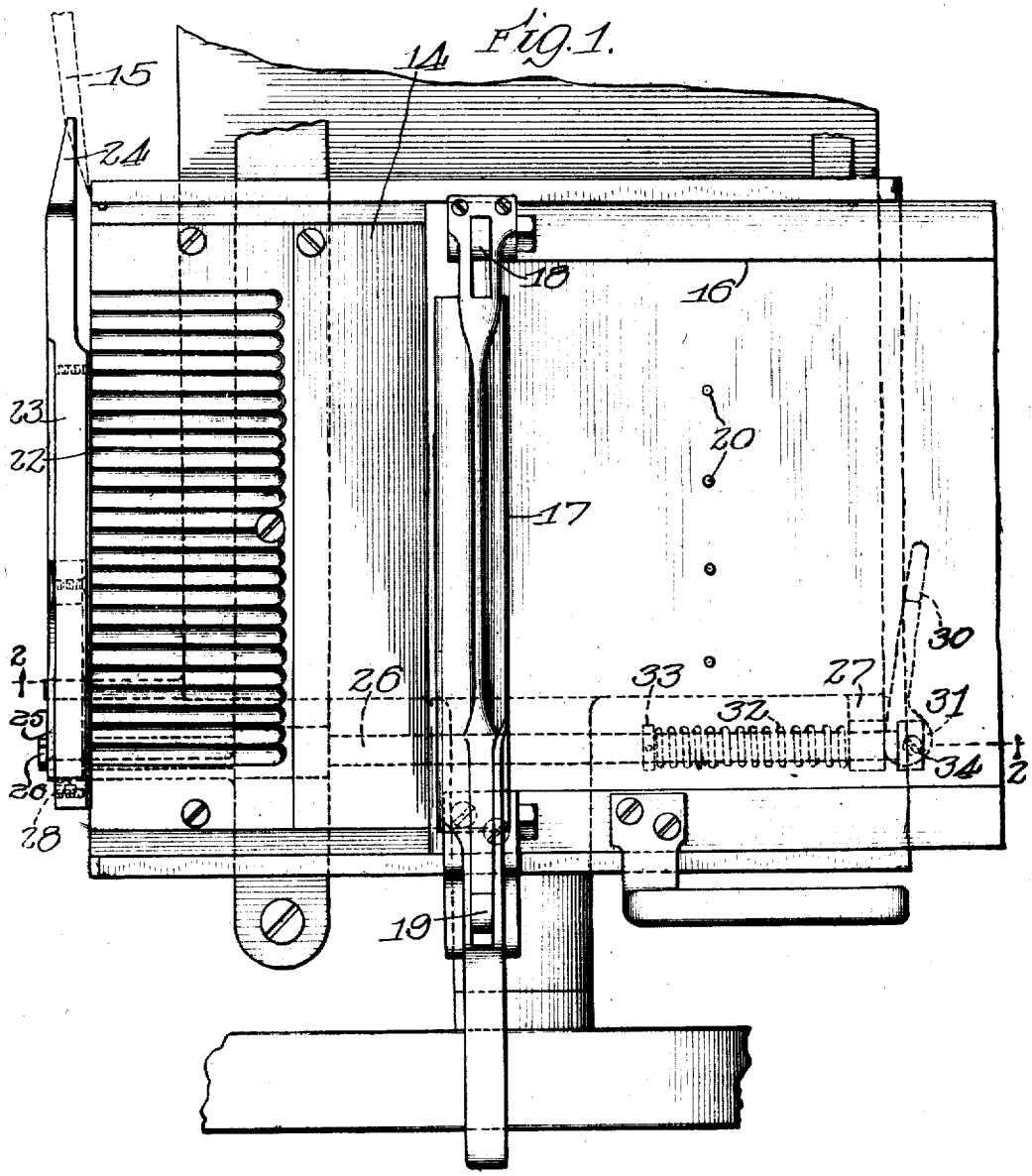
Witnesses:
T. J. Sauser
P. Burkhardt
Inventor:
John I. McCormick
By J. Jochum Atty.

J. I. McCORMICK.
MEAT ADJUSTING PLATE FOR SLICING MACHINES.
APPLICATION FILED JAN. 6, 1913.
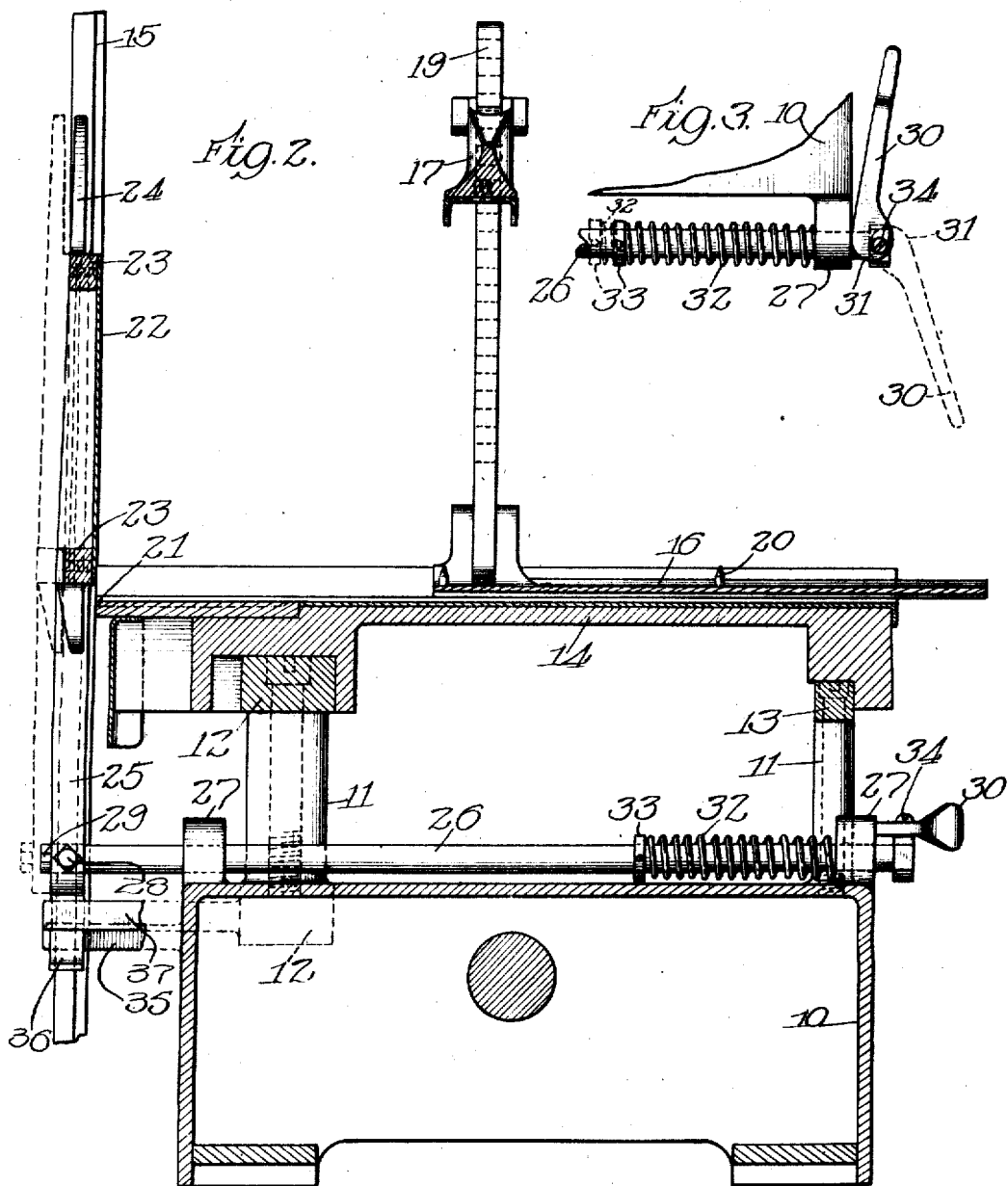

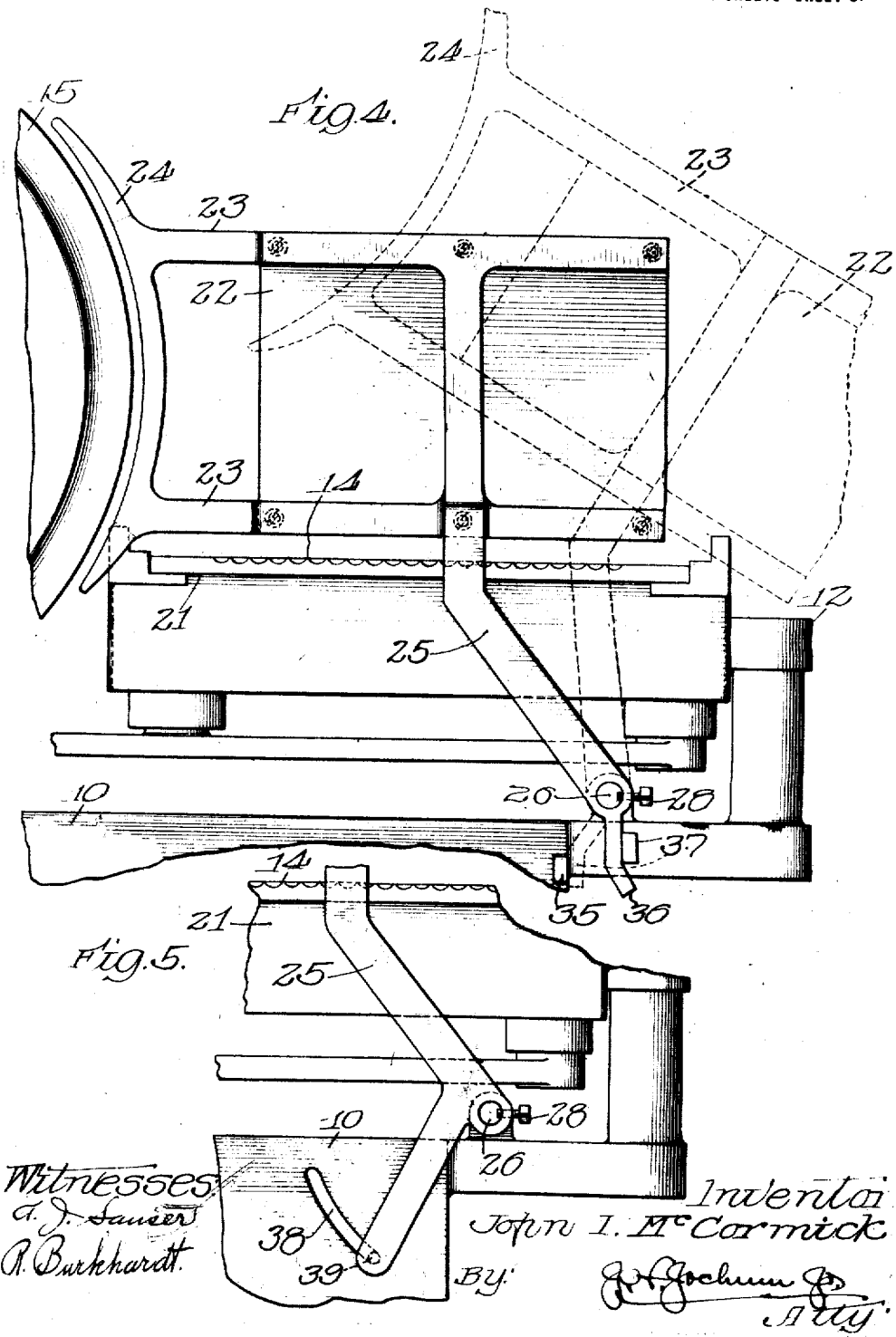

UNITED STATES PATENT OFFICE.

JOHN I. McCORMICK, OF CHICAGO, ILLINOIS, ASSIGNOR TO U. S. SLICING MACHINE COMPANY, OF CHICAGO, ILLINOIS, A CORPORATION OF ILLINOIS.

MEAT-ADJUSTING PLATE FOR SLICING-MACHINES.

1,242,958.   Specification of Letters Patent.   Patented Oct. 16, 1917.

Application filed January 6, 1913. Serial No. 740,298.

*To all whom it may concern:*

Be it known that I, JOHN I. McCORMICK, a citizen of the United States, residing at Chicago, in the county of Cook and State of Illinois, have invented certain new and useful Improvements in Meat-Adjusting Plates for Slicing-Machines, of which the following is a specification.

Heretofore with slicing machines of the type embodying a relatively movable support and cutter, it has been almost impossible to replace a piece of meat into the machine, after it has been cut and removed from the machine, in such a manner that the first slice cut after the meat has been replaced will be whole or unbroken. Usually the meat is replaced and adjusted on the meat support as nearly as possible to produce a whole slice at the first cutting, but inasmuch as the operator must guess at such position, the meat cannot always be properly placed in this manner. This will result in a number of small pieces or broken slices being cut off before a whole slice can be obtained, resulting further in a loss to the merchant as the small pieces or broken slices are not always salable.

To overcome these difficulties and objections and to provide means whereby the piece of meat after it has been cut, may be placed in the machine and accurately positioned so that a whole slice may be cut from the piece of meat upon the first operation of the machine is one of the objects of the present invention.

A further object is to provide an improved machine of this class having a meat adjusting plate which may be readily moved into an operative position to be engaged by the meat to position the latter on the support, and to be as readily moved into an inoperative position after the meat is secured in position, to permit the meat to be cut, as distinguished from a gage against which the article to be cut is fed or moved to determine or regulate the thickness of the slice to be cut.

A further object is to provide an improved device of this class which will be simple, durable and cheap in construction, and effective and efficient in operation.

To the attainment of these ends and the accomplishment of other new and useful objects as will appear, the invention consists in the features of novelty, in substantially the construction, combination and arrangement of the several parts hereinafter more fully described and claimed and shown in the accompanying drawings exemplifying this invention and in which;

Figure 1 is a top plan view of a portion of a slicing machine having a meat adjusting plate applied thereto, constructed in accordance with the principles of this invention.

Fig. 2 is a longitudinal sectional view taken on line 2—2, Fig. 1.

Fig. 3 is a view in elevation of a detail.

Fig. 4 is a detail front elevation taken from the left hand side of Fig. 2, and showing the meat adjusting plate in operative position in full lines, and in another of its positions in dotted lines.

Fig. 5 is a view in elevation of a modified form of detail.

Referring more particularly to the drawings, and in the present exemplification of this invention the numeral 10 designates the supporting base of the machine having uprights 11 rising therefrom and which uprights support the guide or supporting rails 12—13, of the reciprocating carriage 14. This carriage 14 is reciprocated upon the rails 12—13 in the ordinary and well known manner, and a cutter 15 of the rotary type is arranged in operative relation to the carriage 14 so that the meat will be carried into a position to be cut by the cutter as the latter revolves. All of the above referred to features however, form no part of the present invention and are common in machines of this type.

Mounted upon the carriage 14 is a meat supporting plate 16, and this plate, together with the carriage 14 form the support for the meat. The plate 16 is adapted to be intermittently moved transversely of the carriage 14 in the ordinary and well known manner so as to advance the meat with respect to the cutting plane of the cutter to present a new portion to be cut off. The meat is clamped or secured upon the plate 16 by means of a meat clamp 17 which is supported by uprights 18—19 and with relation to which uprights the meat clamp is adjustable. Pins 20 may also be provided on the plate 16 for assisting in holding the meat. The cutter 15 is arranged adjacent the edge 21 of the meat support thus formed and in close proximity thereto so that each time the piece of meat is advanced so that a portion of the meat will project over such edge, the projecting portion will be cut off by the cutter upon the relative movement of the meat support and cutter.

Arranged adjacent the edge of the meat support is a meat adjusting plate 22 which may be constructed of any desired size and configuration, and of any suitable material. In the present exemplification of the invention however this plate is shown as being constructed of a piece of sheet material arranged uprightly with respect to the meat support and is supported upon a frame 23, a portion of which frame is shaped to form a cutter guard 24, which guard is preferably curved as shown to conform to the contour of the cutter. The meat adjusting plate and the cutter guard are therefore formed as of an integral structure so that when one is adjusted the other will be likewise adjusted. The plate is supported for such adjustment in any desired or suitable manner such as by means of an arm or bracket 25 preferably arranged to extend downwardly in front of the meat support and adjacent the edge 21 thereof. A shaft 26 is supported in suitable bearings 27 and extends preferably from the front to the rear of the machine, and one end of the shaft terminates adjacent the edge 21 of the meat support and upon which end the arm 25 is sleeved. A fastening device 28 is provided which passes through the sleeved portion of the arm 25, and which sleeved portion is preferably formed as an aperture through the arm, and engages the shaft 26 for securing the two together so that when the shaft is moved the arm 25 as well as the meat adjusting plate will be correspondingly moved.

If desired the shaft 26 may be provided with a groove 29 into which the fastening device 28 extends.

The other extremity of the shaft 26 preferably projects beyond the rear of the machine and pivotally connected to such extremity is a lever 30 having a cam face 31 which coöperates with a portion of the bearing 27 to move the shaft 26 longitudinally in a manner to be described. Encircling the shaft 26, preferably the rear extremity thereof, is an elastic member 32 one end of which abuts the bearing 27 and the other end abuts a collar 33 secured to the shaft 26.

The shaft 26 is of such a length and the meat adjusting plate 22 is connected with this shaft in such a manner that when the shaft 26 is shifted longitudinally in its bearings in one direction, it will draw the meat adjusting plate up to the edge 21 of the meat support and into the cutting plane of the cutter, and the cutter guard 24 will be likewise adjusted toward the cutting plane of the cutter.

The elastic member 32 is so disposed that it tends normally to move the cutter plate and the guard away from the edge 21 of the meat support and into the positions shown in dotted lines in Fig. 2, when the lever 30 is moved into the position shown in dotted lines in Fig. 3.

When the lever 30 is moved into the full line position shown in Fig. 3 the cam face 31 of the lever will engage the face of the bearing 27 and will move the shaft 26 longitudinally and against the tension of the elastic member 32.

The pivot 34 of the lever is so arranged with relation to the cam face that when the lever 30 is in the position shown in full lines in Fig. 3 the shaft will be locked in this position so that it can not be shifted longitudinally by any strain against the plate 22, caused by the adjustment of the meat thereagainst.

When the plate 22 is in the position shown in full lines in Fig. 2, the meat may be placed upon the plate 16 and the latter adjusted on the carriage 14 toward the cutter. The cut face of the meat, or the face from which previous slices have been cut will contact with the plate 22 and the meat may be so adjusted with respect to the meat support to cause the cut face of the meat to rest flat against the meat adjusting plate, thereby insuring a complete, whole and uniform slice being cut from the meat at the next operation of the machine. When the meat is thus positioned the meat clamp 17 is adjusted to clamp the meat to the support, and the lever 30 is then next adjusted from the full line to the dotted line position, shown in Fig. 3, thereby permitting the elastic member 32 to move the meat adjusting plate into an inoperative position, laterally away from the meat and into the position shown in dotted lines in Fig. 2 to permit the meat to be cut.

Thus it will be manifest that a piece of meat may be taken from the machine and replaced any number of times and the operator will be assured that the first slice cut from the piece of meat will be a whole and uniform slice instead of necessitating the cutting off of several small pieces before the meat will aright itself for a whole slice.

In order to permit the meat adjusting plate 22 as well as the cutter guard to be thrown back out of the way so as to permit an unobstructed access to the cutter for cleaning the same, the shaft 26 is mounted so as to rotate in the bearings 27, thereby rendering it possible to swing the meat adjusting plate and the guard 24 from the full line position to the dotted line position shown in Fig. 4.

In order to limit this movement of the plate, a stop 35 may be provided with which a projection 36 on the arm 25 engages to hold the plate in one of its positions and another stop 37 may be provided which is adapted to be engaged by said portion of the arm 25 to hold the plate in another of its positions.

In Fig. 5 of the drawings, the stops 35—37 are dispensed with and in lieu thereof a curved slot 38 is provided in the face of a fixed portion of the machine and into which slot a pin or projection 39 on the arm 25 moves. The slot is of such a shape and length that the ends thereof will form the stops for holding the cutter plate in its respective positions.

While in the present exemplification of this invention the preferred forms and constructions have been shown and described and claimed in connection with meat slicing machines, it is to be understood that this invention is not to be limited in its use with meat slicing machines, as it will operate with equal efficiency in connection with other slicing machines; and furthermore many changes may be made in the details of construction, and in the arrangement of the parts, without departing from the spirit of this invention.

The terms plate and abutment, as employed in the specification and claims are to be construed in their broadest interpretation, to mean any form of stop, that is movable into a position to be engaged by the meat while the latter is being positioned on the support, and out of engagement with the meat so that the portion of the meat which contacted therewith can be cut.

What is claimed as new is:—

1. The combination of a relatively movable article holder and cutter, an abutment coöperating with the holder and against which abutment the article is moved only while being initially positioned with respect to the holder, and means whereby the said abutment may be moved into an inoperative position away and free from the article and maintained in such position and against operation after the article is once positioned thereby.

2. In a slicing machine, the combination of a relatively movable article support and cutter, an article adjusting plate coöperating with the support, means supporting said plate for movement laterally into the cutting plane of the cutter for initially positioning the article and for movement out of such plane to permit the article to be cut, and means whereby another different and independent movement may be given to the plate with respect to the cutter, to move and maintain the plate in an inoperative position after the article is once positioned thereby.

3. In a slicing machine, the combination of a relatively movable article support and cutter, an article adjusting plate coöperating with the support, means supporting the plate for movement toward the cutting plane of the cutter for initially positioning the article and for movement away from such plane into a position that it will not be engaged by the article, to permit the article to be cut, said plate having a fixed operating position with and in close relation to the cutter, means whereby another and different movement may be given to the plate with relation to the cutter to permit unobstructed access to the cutter and a cutter guard connected with the plate.

4. In a slicing machine, the combination of a relatively movable meat support and cutter, a meat adjusting plate coöperating with the support and movable toward the cutting plane of the cutter for positioning the meat and away from such plane to permit the meat to be cut, said plate having a fixed operative position and in close relation to the cutter and being also adapted for another and different movement with relation to the cutter to permit unobstructed access to the cutter, and a cutter guard connected with the plate, said guard moving into the cutting plane when the plate is moved into operative position, and out of such plane when the plate is moved into an inoperative position.

5. In a slicing machine, the combination of a relatively movable meat support and cutter, a meat adjusting plate coöperating with the support and movable into operative position for positioning the meat and out of such position to permit the meat to be cut, and a cutter guard connected with the plate and movable in response thereto, said guard being movable toward the cutting plane of the cutter when the plate is moved into operative position and away from such plane when the plate is moved into an inoperative position, said plate and guard being also capable of another and different movement whereby unobstructed access may be had to the cutter.

6. A cutter and an adjustable guard for that portion of the edge of the cutter where the actual cutting is effected, said guard being shaped to follow the contour of the cutter edge and having connected with it a meat adjusting plate, said guard being freely adjustable at will into and out of operative position and being maintained in an operative position during the cutting operation.

7. In a slicing machine, the combination of a relatively movable meat support and cutter, and a combined meat adjusting plate and guard for that portion of the cutting edge of a cutter where the actual cutting is effected, said guard being shaped to follow the contour of the cutter edge, and freely adjustable at will into and out of operative position, said plate being maintained in an operative position during the cutting operation.

8. In a slicing machine, the combination of a relatively movable meat support and cutter, and a combined meat adjusting plate and cutter guard mounted for simultaneous adjustment into and out of their respective operative positions, said guard and plate being also mounted for another separate adjustment away from the cutter to permit unobstructed access to the cutter, and being maintained in the last said position during the cutting operation.

9. In a slicing machine, the combination of a relatively movable meat support and cutter, a combined meat adjusting plate and cutter guard mounted for simultaneous adjustment into and out of their respective operative positions, said guard and cutter being also adapted to be swung away from the cutter, and maintaned in the last said position during the cutting operation.

10. In a slicing machine, the combination of a relatively movable meat support and cutter, a combined meat adjusting plate and cutter guard mounted for simultaneous adjustment into and out of their respective operative positions, said guard and plate being also adapted to be swung out of the way with respect to the cutter, and means for effecting such movement and said adjustments of the guard and plate.

11. A guard for that portion of the edge of the cutter of a slicing machine where the actual cutting is effected, said guard mounted for free adjustment at will with respect to the cutter edge into and out of the cutting plane of the said edge, and means for retaining the guard in each of its adjusted positions, said guard shaped to follow the contour of the cutter edge.

12. In a slicing machine the combination of a relatively movable meat support and cutter, and a combined meat adjusting plate and cutter guard mounted for simultaneous adjustment in and out of their respective operative positions, said guard and plate being also adapted to be swung out of the way with respect to the cutter and maintained in such position during the cutting operation.

13. A cutter for slicing machines, and a guard for that portion of the cutter where the cutting is effected, said guard comprising an element conforming to the contour of the cutter edge, said guard mounted for free pivotal movement toward and away from the cutter and in a plane substantially parallel with the cutting plane.

14. In a slicing machine, the combination of a relatively movable meat support and cutter, and a guard for that portion of the edge of the cutter when the actual cutting is effected, said guard being freely adjustable at will relatively toward and away from the cutting edge, and also freely adjustable at will away from the cutting edge in a direction different from the first recited direction of adjustment to afford unobstructed access to the cutter edge.

15. In a slicing machine, the combination of a relatively movable meat support and cutter, an article positioning element coöperating with the support, said element being freely adjustable at will laterally with respect to the cutter edge toward the cutter to be engaged by the article on the support and away from the article when the latter is initially positioned, said element being freely adjustable at will toward and away from the cutter edge in directions different from the first recited adjustments.

16. The combination of a relatively movable article support and cutter, a positioning element coöperating with the support, and provisions whereby said element may be temporarily positioned with respect to the support to be engaged by the face of the article to be cut for positioning said face substantially parallel with the cutting face of the cutter, said element being also freely movable into and maintained in a position where it will not be engaged by the article after the initial positioning of the article.

17. In a slicing machine, the combination of a cutter, a support for the article, an abutment coöperating with the support and with which abutment one face of the article has engagement only while the article is being initially positioned upon the support to be cut by the cutter, said abutment being adapted to be moved into and maintained in a position that it will not be engaged by the article or interfere with the slices being collected as they are cut from the article, after the article is initially positioned upon the support by the said abutment.

In testimony whereof I have signed my name to this specification, in the presence of two subscribing witnesses, on this 4th day of January, A. D. 1913.

JOHN I. McCORMICK.

Witnesses:
CHANNING L. SENTZ,
F. E. SCHULTZ.